United States Patent [19]

Cowley et al.

[11] Patent Number: 5,286,554
[45] Date of Patent: Feb. 15, 1994

[54] SUBSTRATE MATERIALS SATURATED WITH LOW VAPORIZABLE ETHYLENICALLY UNSATURATED MONOMER EMISSION VINYL ESTER AND POLYESTER RESIN COMPOSITIONS

[75] Inventors: Terry W. Cowley; Mary L. N. White, both of Lake Jackson, Tex.

[73] Assignee: The Dow Chemical Company, Midland, Mich.

[21] Appl. No.: 996,545

[22] Filed: Dec. 24, 1992

Related U.S. Application Data

[62] Division of Ser. No. 797,640, Nov. 25, 1991, Pat. No. 5,206,077.

[51] Int. Cl.$^5$ .................... B32B 7/10; B32B 27/04; D04H 1/58
[52] U.S. Cl. .................... 428/260; 428/261; 428/270; 428/272; 428/273; 428/274; 428/288; 428/289; 428/290; 428/291; 428/294; 428/408; 428/902
[58] Field of Search ............... 428/408, 260, 261, 270, 428/272, 273, 274, 289, 288, 290, 291, 294, 202

[56] References Cited

U.S. PATENT DOCUMENTS

| | | | |
|---|---|---|---|
| 1,382,345 | 6/1921 | Darrin | 524/313 |
| 2,343,997 | 3/1944 | Powell et al. | 524/310 |
| 2,382,529 | 8/1945 | Auer | 524/112 |
| 2,509,495 | 5/1950 | Hammond | 554/27 |
| 2,654,718 | 10/1953 | Grummit et al. | 524/379 |
| 3,272,640 | 9/1966 | Geurden | 524/53 X |
| 3,359,220 | 12/1967 | Wright | 521/56 |
| 3,875,091 | 4/1975 | Tsugukuni et al. | 524/272 |
| 4,201,826 | 5/1980 | Nylander | 428/268 X |
| 4,218,546 | 8/1980 | Downing et al. | 525/170 |
| 4,220,574 | 9/1980 | Perrone | 524/571 |
| 4,269,745 | 5/1981 | Neumann | 525/36 X |
| 4,304,883 | 12/1981 | Fujii et al. | 525/170 |
| 4,387,171 | 6/1983 | Russell | 523/518 |
| 4,391,938 | 7/1983 | Memon et al. | 524/114 X |
| 4,424,299 | 1/1984 | Penczek et al. | 525/31 |
| 4,486,561 | 12/1984 | Chung et al. | 524/114 X |
| 4,525,498 | 6/1985 | Atkins et al. | 523/511 |
| 4,546,142 | 10/1985 | Walewski | 524/487 |
| 4,559,375 | 12/1985 | Schols et al. | 523/449 |
| 4,609,693 | 9/1986 | Schols et al. | 523/465 |
| 4,619,953 | 10/1986 | Schols et al. | 523/465 |
| 4,622,354 | 11/1986 | Iseler et al. | 523/527 |
| 4,729,791 | 3/1988 | Laura et al. | 524/166 |
| 4,745,141 | 5/1988 | Akiyama et al. | 523/500 |
| 4,918,120 | 4/1990 | Vanderlaan et al. | 523/465 |
| 4,927,875 | 5/1990 | Maska et al. | 524/487 X |
| 5,057,565 | 10/1991 | Noding et al. | 524/114 X |
| 5,164,240 | 11/1992 | Burgess | 428/290 X |
| 5,178,657 | 1/1993 | Gicquel | 428/290 X |

FOREIGN PATENT DOCUMENTS

| | | |
|---|---|---|
| 0000941 | 3/1979 | European Pat. Off. |
| 0031434 | 7/1981 | European Pat. Off. |
| 2011918A | 1/1979 | United Kingdom |

OTHER PUBLICATIONS

Derwent Abstracts, EPA 0000941, AN-79-18394B/10 (18394B).

Primary Examiner—Judy M. Reddick

[57] ABSTRACT

Substrate materials are saturated with vinyl ester or polyester resins containing polymerizable, vaporizable, ethylenically unsaturated monomers and an emission suppressing amount of ceresin wax and a drying oil such as corn oil and an epoxidized drying oil such as epoxidized soybean oil. The secondary adhesion is improved. The substrate materials are useful in the preparation of laminates.

4 Claims, No Drawings

SUBSTRATE MATERIALS SATURATED WITH LOW VAPORIZABLE ETHYLENICALLY UNSATURATED MONOMER EMISSION VINYL ESTER AND POLYESTER RESIN COMPOSITIONS

CROSS-REFERENCE TO RELATED APPLICATIONS(S)

This application is a division of application Ser. No. 97,796,640 filed Nov. 25, 1991 and now U.S. Pat. No. 5,206,077 which is incorporated herein by reference in its entirety.

FIELD OF THE INVENTION

The present invention concerns low styrene emission vinyl ester and Polyester formulations containing ceresin wax as a styrene emission depressant and drying oil and epoxidized drying oil as secondary adhesion promoters.

BACKGROUND OF THE INVENTION

Most vinyl ester resins and unsaturated polyester resins contain polymerizable, vaporizable, ethylenically unsaturated monomers such as styrene as a reactive diluent. Since styrene or other polymerizable, vaporizable, ethylenically unsaturated monomer is a volatile component which tends to be released to the atmosphere during storage and/or curing of the thermosettable vinyl ester and unsaturated polyester resins, it is becoming more and more desirable to reduce the level of styrene or other polymerizable, vaporizable monomer which is released to the atmosphere during storage and/or cure. One method for reducing the release of styrene or other polymerizable, vaporizable monomer into the atmosphere is to include ceresin wax in the formulation. While this does indeed reduce the amount of styrene released into the atmosphere, the composition suffers from a loss in secondary adhesion. It would therefore be highly desirable and beneficial to incorporate into the formulation components which will eliminate or decrease the loss in secondary adhesion.

It has now been discovered that the loss in secondary adhesion from polymerizable, vaporizable, ethylenically unsaturated monomer such as styrene containing vinyl ester and unsaturated polyester formulations containing ceresin wax as a polymerizable, vaporizable, ethylenically unsaturated monomer emission suppressant can be accomplished by incorporating into the formulation a combination of corn oil and epoxidized soybean oil.

SUMMARY OF THE INVENTION

The present invention concerns an improvement in vinyl ester and unsaturated polyester resin compositions containing a polymerizable, vaporizable, ethylenically unsaturated monomer and a polymerizable, ethylenically unsaturated monomer emission suppression amount of ceresin wax; which improvement comprises employing in said compositions a secondary adhesion promoting amount of at least one drying oil and at least one epoxidized drying oil.

Another aspect of the present invention pertains to a polymerizable, vaporizable, ethylenically unsaturated vinyl monomer suppressant/secondary adhesion promoter additive composition comprising (1) at least one vaporizable ethylenically unsaturated monomer, (2) ceresin wax, (3) at least one drying oil, and (4) at least one epoxidized drying oil.

Another aspect of the present invention pertains to a curable composition comprising (A) at least one vinyl ester resin or at least one unsaturated polyester resin or a combination thereof; (B) at least one polymerizable, vaporizable, ethylenically unsaturated monomer; (C) a polymerizable, ethylenically unsaturated monomer emission suppression amount of ceresin wax; (D) a secondary adhesion promotion amount of at least one drying oil; (E) a secondary adhesion promotion amount of at least one epoxidized drying oil; and (F) a curing amount of a suitable curing agent.

A further aspect of the present invention pertains to a substrate material saturated or impregnated with the aforementioned curable composition.

A further aspect of the present invention pertains to the product or article resulting from shaping one or more plies of the aforementioned saturated or impregnated substrate material into a desired configuration and curing.

The present invention may suitably comprise, consist of, or consist essentially of, the aforementioned components.

The invention illustratively disclosed herein may suitably be practiced in the absence of any component which is not specifically disclosed or enumerated herein.

DETAILED DESCRIPTION OF THE INVENTION

Additive Composition

The vaporizable ethylenically unsaturated vinyl monomer suppressant/secondary adhesion promoter additive composition of the present invention usually comprises (1) from about 20% to about 40%, preferably from about 20% to about 35%, more preferably from about 25% to about 35% percent by weight of at least one vaporizable ethylenically unsaturated monomer, (2) from about 10% to about 25%, preferably from about 10% to about 20%, more preferably from about 13% to about 17% percent by weight ceresin wax, (3) from about 10% to about 30%, preferably from about 18% to about 28%, more preferably from about 20% to about 26% percent by weight of at least one drying oil, and (4) from about 20% to about 40%, preferably from about 20% to about 35%, more preferably from about 25% to about 35% percent by weight of at least one epoxidized drying oil.

Vinyl Ester Resins

Suitable vinyl ester resins which can be employed herein include any such resin prepared by the reaction of an epoxy resin having an average of more than one vicinal epoxy group per molecule with an unsaturated carboxylic acid. The reactants are usually employed in amounts which provide a ratio of acid groups per epoxy group of from about 0.95:1 to about 1.05:1, preferably from about 1:1.

Suitable epoxy resins include those which contain an average of more than one glycidyl group per molecule such as for example glycidyl derivatives of aliphatic, cycloaliphatic or aromatic compounds containing an average of more than one hydroxyl, carboxyl or amine group per molecule or any combination thereof and the like. Particularly suitable such epoxy resins include, for example, the glycidyl ethers of resorcinol, catechol, hydroquinone, bisphenol A, bisphenol F, bisphenol K, fluorene, phenol- or cresolaldehyde resins, halogenated, particularly bromine substituted derivatives thereof, or any combination thereof and the like.

Suitable unsaturated carboxylic acids which can be employed in the preparation of the vinyl ester resins include, for example, acrylic acid, methaerylic acid, glacial methaerylic acid, or any combination thereof and the like.

The reaction between the epoxy resin and the unsaturated acid is usually conducted at temperatures of from about 90° C. to about 1300° C., preferably from about 1000° C. to about 1200° C., more preferably from about 105° C. to about 1150° C. for a time sufficient to complete the reaction. The reaction is usually considered complete when the percent acid has reached a value of 1. The reaction time is usually from about 3 to about 6 hours.

If desired, a catalyst for promoting the reaction between the epoxy resin and the unsaturated acid can be employed. Suitable such catalysts include, tris(dimethylaminomethyl)phenol, tetraethyl ammonium bromide, or any combination thereof and the like. Particularly suitable such catalysts include, for example, or any combination thereof and the like. Particularly suitable such catalysts include, for example tris(dimethylaminomethyl)phenol, or any combination thereof and the like. The catalysts are usually employed in amounts of from about 0.05 to about 0.08, preferably from about 0.055 to about 0.075, more preferably from about 0.065 parts of catalyst per 100 parts of resultant mixture of the carboxylic acid and epoxy resin.

Unsaturated Polyester Resins

Suitable unsaturated polyester resins which can be employed herein include, for example, those prepared by reacting a compound having an average of more than one, preferably about two, aliphatic, cycloaliphatic or aromatic hydroxyl groups per molecule with a compound having pin average of more than one aliphatic, cycloaliphatic or aromatic carboxyl groups per moleculei with the proviso that there be present at least one reactant which contains polymerizable unsaturated groups. The reactants are usually employed in amounts which provide a ratio of acid groups per hydroxyl group.

Particularly suitable compounds containing an average of more than one hydroxyl group per molecule from which unsaturated polyester resins can be prepared include, for example, those compounds having aliphatic, cycloaliphatic or aromatic hydroxyl groups. Particularly suitable such compounds include, for example propylene glycol, ethylene glycol, bisphenol A, or any combination thereof and the like.

Suitable compounds containing an average of more than one carboxylic acid group per molecule from which unsaturated polyester resins can be prepared include, for example, fumaric acid, maleic anhydride, succinic anhydride, chlorendic anhydride, orthophthalic acid or anhydride isophthalic acid or anhydride, terephthalic acid or anhydride, or any combination thereof and the like.

The reaction between the hydroxyl containing compound and the acid is usually conducted at temperatures of from about 150° C. to about 190° C., preferably from about 170° C. to about 190° C., more preferably from about 1750° C. to about 1850° C. for a time sufficient to complete the reaction. The reaction is usually considered complete when the acid number has reached a value of 50 or below. The reaction time is 6 to about 16 hours.

If desired, a catalyst for promoting the reaction between the hydroxyl-containing compound and the catalyst can be employed. Suitable such catalysts include, butyl stannoic acid, para-toluene sulfonic acid, or any combination thereof and the like. Particularly suitable such catalysts include, for example butyl stannoic acid, or any combination thereof and the like. The catalysts are usually employed in amounts of from about 0.05 to about 1.0, preferably from about 0.05 to about 0.1, more preferably from about 0.075 parts of catalyst per 100 parts resultant mixture of carboxylic acid and hydroxyl containing compound.

Porizable ethylenically unsaturated monomers

Suitable polymerizable, vaporizable, ethylenically unsaturated monomers which can be employed herein include, for example, styrene, alpha-methyl styrene, chlorostyrene, vinyl benzene, vinyl toluene, p-methylstyrene, divinylbenzene, or any combination thereof and the like. Also suitable are the $C_1$-$C_8$ alkyl esters of acrylic and methacrylic acid. Styrene is the preferred polymerizable, vaporizable, ethylenically unsaturated vinyl monomer.

The polymerizable, vaporizable, ethylenically unsaturated monomers are usually employed in amounts of from about 20 to about 60, preferably from about 35 to about 55, more preferably from about 40 to about 50 percent by weight based upon the combined weight of the resin and the polymerizable, vaporizable, ethylenically unsaturated monomer.

Ceresin Wax

Ceresin wax employed herein is a mixture of hydrocarbons of complex composition purified by treatment with concentrated sulfuric acid and filtered through boneblack having a melting point of 610° C. to 78° C. Other names for ceresin wax are: ozokerite wax 170-D, ozokerite wax 170 M.B., white ozokerite wax, yellow ozokerite wax, yellow ozokerite wax S special, S&P ozokerite wax yellow, etc. Strahl & Pitsch Inc., a producer of ceresin wax, defines ozokerite as a hydrocarbon wax derived from mineral or petroleum sources.

The ceresin wax is employed in any amount which will suppress emission of styrene or other volatile polymerizable ethylenically unsaturated monomers contained in the formulation during storage and curing. Particularly suitable amounts of ceresin wax include, for example, from about 0.15% to about 0.4%, preferably from about 0.15% to about 0.3%, more preferably from about 0.18% to about 0.25 percent by weight based upon the combined weight of the styrene (polymerizable ethylenically unsaturated monomer), any other reactive diluent (polymerizable ethylenically unsaturated monomer) which may be present, and resin.

Drying Oil

The term "drying oil" as employed herein means any naturally occurring oil which contains glycerides of linoleic and/or linolenic acids. Suitable drying oils will have an Iodine value of from about 100 to about 210, preferably from about 115 to about 150, more preferably from about 115 to about 140. Particularly suitable such drying oils include, for example, corn oil, linseed oil, safflower oil, soybean oil, sunflower oil, cottonseed oil, rapeseed oil, perilla oil, hempseed oil, or any combination thereof and the like. Corn oil and soybean oil are preferred.

The drying oil is employed in any amount which in combination with the epoxidized drying oil will enhance the secondary adhesion of the formulation. Particularly suitable amounts of drying oil include, for example, from about 0.1% to about 0.7, preferably from about 0.2% to about 0.5%, more preferably from about 0.25% to about 0.4% percent by weight based upon the combined weight of the styrene (polymerizable ethylenically unsaturated monomer), any other reactive diluent (polymerizable ethylenically unsaturated, monomer) which may be present, and tesin.

The term "epoxidized drying oil" includes any naturally occurring oils which contains glycerides of linoleic and or linolenic acids and which have been epoxidized. Suitable such epoxidized drying oils include, for example, epoxidized soybean oil, epoxidized corn oil, epoxidized linseed oil, epoxidized safflower oil, epoxidized sunflower oil, epoxidized, cottonseed oil, epoxidized rapeseed oil, epoxidized perilla oil, epoxidized hempseed oil, or any combination thereof and the like. Epoxidized soybean oil and epoxidized corn oil are preferred.

The epoxidized drying oils can be prepared by reacting an epihalohydrin with the desired drying oil and then dehydrohalogenating the resultant halohydrin intermediate with a suitable basic-acting compound such as, for example, an alkali metal halide, alkali metal carbonate and the like. Sodium hydroxide is preferred. Several epoxidized drying oils are available commercially such as, for example epoxidized soybean oil is available from Atochem North America as VIKOFLEX 7170, epoxidized Linseed Oil is available from Atochem North America as VIKOFLEX 7190.

The epoxidized drying oil is employed in any amount which in combination with the drying oil will enhance the secondary adhesion of the formulation and retard styrene volatilization some. Particularly suitable amounts of epoxidized drying oil include, for example, from about 0.2 to about 0.7, preferably from about 0.3 to about 0.6, more preferably from about 0.35 to about 0.55 percent by weight based upon the combined weight of the styrene (polymerizable ethylenically unsaturated monomer), any other reactive diluent (polymerizable ethylenically unsaturated monomer) which may be present, and resin.

Curing Agents and Accelerators or Promoters

The compositions of the present invention can be cured by any means suitable for curing vinyl ester resins and unsaturated polyester resins. They can be suitably cured by means of azo compounds, peroxides, or any combination thereof and the like. Particularly suitable curing agents include, for example, methyl ethyl ketone peroxide, cumene hydroperoxide, benzoyl peroxide, or any combination thereof and the like.

The curing catalysts are usually employed in amounts of from about 1 to about 2.5, preferably from about 1 to about 1.5, more preferably from about 1 to about 1.25 percent by weight based upon the weight of the resin.

Also, if desired, curing accelerators or promoters can be employed. Suitable such curing accelerators or promoters include, for example, cobalt naphthenate, cobalt octoate, N,N-dimethylaniline, N,N-dimethylacetoacetamide, or any combination thereof and the like.

The curing accelerators or promoters are usually employed in amounts of from about 0.05 to about 0.6, preferably from about 0.1 to about 0.4, more preferably from about 0.1 to about 0.3 percent by weight based upon the weight of the resin.

Substrate Materials

Suitable substrate materials which can be saturated or impregnated with the curable compositions of the present invention include natural or synthetic fibers in woven, mat or multifilament strand form. Suitable such materials can be nylon, rayon, cotton, glass, graphite, carbon, aramid, polyester, or any combination thereof and the like.

Other additives can be added to the compositions of the present invention such as, for example, pigments, dyes, fillers, or any combination thereof and the like.

The curable compositions are useful in the preparation of laminates, coatings, polymer concrete and the like. The following components are employed in the examples and comparative experiments.

Vinyl Ester Resin (VER) A is a vinyl ester resin prepared from a diglycidyl ether of bisphenol A having an epoxide equivalent weight of 380 to 420 and methacrylic acid in an equivalent ratio of acid per epoxy group of 1:1. The resin contains 45 percent styrene by weight.

Polyester Resin (PER) A is a rigid, low reactivity, low viscosity, thixotropic, orthophthalic laminating resin commercially available from Reichhold as POLYCITE TM Polyester Resin 33-087. The resin is prepromoted for room temperature curing with the addition of methyl ethyl ketone peroxide. The resin contains 43–47 percent styrene by weight.

The following tests are performed on the vinyl ester and/or unsaturated polyester compositions.

ETHYLENICALLY UNSATURATED MONOMER EMISSIONS

The test is based on a completely catalyzed, curable, system since it is under curing conditions that most of the volatile ethylenically unsaturated monomer is lost.

The temperature and relative humidity conditions at which the test is conducted is recorded. 100 +/−0.5 grams of catalyzed resin is poured into a tared one gallon (3.78 l) paint can lid having an opened paper clip and the ethylenically unsaturated monomer emissions measured by the weight loss as the resin formulation gels and up to one hour after the gel time. The gel time is determined by raising the paper clip from the resin periodically until the resin tears or sticks to the paper clip. The ethylenically unsaturated monomer loss is reported in $g/m^2$ and is determined by multiplying the gram weight loss by the factor 60.56. The factor is given in the procedure from the California South Coast Air Quality Board.

SECONDARY ADHESION

The secondary adhesion promotion test is a cycle flexing test conducted on cured laminates at 70% of the flexural strength determined by ASTM D 790-86. The secondary adhesion test is determined by ASTM D 3479-76(82).

The primary laminate is prepared by saturating 6"×12" glass layers in the following sequence, CSM/Wr/CSM/Wr/DXM. All layers are thoroughly wet, with resin, but the surface of the last layer of chopped strand mat is not excessively resin rich. The last chopped strand mat layer is allowed to wet out almost entirely from the addition of resin on the preceding mat layer. (If the layer of chopped strand mat in the initial lay-up is excessively resin rich, satisfactory secondary adhesion may not be achieved. Too high of an amount of ceresin wax per surface area may develop, which the secondary adhesion promoter may not overcome. A resin rich surface is not as structurally sound as one that contains the appropriate amount of glass near the surface.) The five-ply laminate is then cured at a temperature of approximately 25° C. for 20-24 hours.

The secondary laminate is then prepared on top of the primary laminate by saturating 6"×12" glass layer in the following sequence, CSM/Wr/CSM.

CSM=1.5 oz. chopped strand mat
Wr=24 oz. wovening roving.

The secondary laminate is then cured at a temperature of approximately 25° C. for at least 20-24 hours. The resultant cured laminate is then subjected to the aforementioned ASTM tests.

EXAMPLE 1

Several formulations are tested for styrene emission and secondary adhesion. The composition and test results are given in Table I.

-continued

| | |
|---|---|
| ceresin wax | 15.3 percent |
| corn oil | 23.1 percent |
| epoxidized soybean oil | 30.8 percent |
| | 100.0 percent |

The blending operation is conducted in a 7-gallon (26.5 L) glass vessel using an air driven stirrer at a temperature of 75° C. When mixture is clear, all wax dissolved, the mixture is allowed to cool to 65° C. to 70° C. Gallon (3.8 L) quantities of the mixture are drained into one gallon (3.8 L) cans, which are sealed and shaken until the cans are at room temperature.

This paste concentrate is employed as an additive to vinyl ester resin A and polyester resin A and tested for styrene loss. The formulations and results are given in Table II.

TABLE II

| | Formulation | | | |
|---|---|---|---|---|
| | A | B | C | D |
| Resin-Styrene preblend, gms | 100 | 100 | 100 | 100 |
| Resin, Type | VER A | VER A | PER A | PER A |
| gms | 55 | 55 | 53-57 | 53-57 |
| Styrene, gms | 45 | 45 | 43-47 | 43-47 |
| percent[a] | 45 | 45 | 43-47 | 43-47 |
| Paste Additive, gms | 1.3 | 1.3 | 1.3 | 1.3 |

TABLE I

| | Formulation | | | | | | | | | |
|---|---|---|---|---|---|---|---|---|---|---|
| | A* | B* | C* | D* | E* | F* | G* | H* | I | J |
| Resin Type | VER A | VER A | VER A | VER A | VER A | VER A | VER A | VER A | VER A | VER A |
| Styrene content, %[a] | 45 | 45 | 45 | 45 | 45 | 45 | 45 | 45 | 45 | 45 |
| MEK peroxide, %[b] | 1.25 | 1.25 | 1.25 | 1.25 | 1.25 | 1.25 | 1.25 | 1.25 | 1.25 | 1.25 |
| Co Nap[d], percent[b] | 0.3 | 0.3 | 0.3 | 0.3 | 0.3 | 0.3 | 0.3 | 0.3 | 0.3 | 0.3 |
| Ceresin Wax, %[b] | 0 | 0 | 0.2 | 0.2 | 0.2 | 0.2 | 0.2 | 0.2 | 0.2 | 0.2 |
| Corn oil, %[b] | 0 | 0 | 0 | 0 | 0.7 | 0.7 | 0 | 0 | 0.3 | 0.3 |
| ESO[c], %[b] | 0 | 0 | 0 | 0 | 0 | 0 | 0.7 | 0.7 | 0.4 | 0.4 |
| Temp., °F. | 78 | 70-74 | 74 | 70-71 | 74-76 | 76-78 | 80-81 | 78-79 | 73-74 | 74-75 |
| °C. | 25.6 | 21.1-23.3 | 23.3 | 21.1-21.7 | 23.3-24.4 | 24.4-25.6 | 26.7-27.2 | 25.6-26.1 | 22.8-23.3 | 23.3-23.9 |
| Relative Humidity, % | 56 | 60-63 | 86 | 56-61 | 60-62 | 68-76 | 62-66 | 70-76 | 60-62 | 62-64 |
| Styrene loss, g/m² | 157 | 213 | 35 | 51.5 | 98.42 | 98.69 | 61.1 | 79.9 | 46 | 76 |
| Secondary Adhesion, Cycles[e] | 21,680 | — | 8,460 | — | 11,540 | — | 11,680 | — | 24,580 | — |

| | Formulation | | | | | | | | | |
|---|---|---|---|---|---|---|---|---|---|---|
| | K* | L* | M* | N* | O* | P* | Q* | R* | S | T |
| Resin Type | PER A | PER A | PER A | PER A | PER A | PER A | PER A | PER A | PER A | PER A |
| Styrene content, %[a] | 43-47 | 43-47 | 43-47 | 43-47 | 43-47 | 43-47 | 43-47 | 43-47 | 43-47 | 43-47 |
| MEK peroxide, %[b] | 1.5 | 1.5 | 1.5 | 1.5 | 1.5 | 1.5 | 1.5 | 1.5 | 1.5 | 1.5 |
| Co Nap[d], percent[b] | — | — | — | — | — | — | — | — | — | — |
| Ceresin Wax, %[b] | 0 | 0 | 0.2 | 0.2 | 0.2 | 0.2 | 0.2 | 0.2 | 0.2 | 0.2 |
| Corn oil, %[b] | 0 | 0 | 0 | 0 | 0.7 | 0.7 | 0 | 0 | 0.3 | 0.3 |
| ESO[c], %[b] | 0 | 0 | 0 | 0 | 0 | 0 | 0.7 | 0.7 | 0.4 | 0.4 |
| Temp., °F. | 73 | 74-76 | 71-72 | 71-72 | 72 | 72 | 71-72 | 71-72 | 72 | 72 |
| °C. | 22.8 | 23.3-24.4 | 21.7-22.2 | 21.7-22.2 | 22.2 | 22.2 | 21.7-22.2 | 21.7-22.2 | 22.2 | 22.2 |
| Relative Humidity, % | 66-75 | 74-76 | 52-56 | 54-57 | 58-62 | 58-62 | 53-55 | 52-55 | 59-63 | 59-63 |
| Styrene loss, g/m² | 163.5 | 156.2 | 54.5 | 55.1 | 89 | 92.6 | 43.6 | 41.8 | 26 | 38.1 |
| Secondary Adhesion, Cycles[e] | 5,100 | — | 10,100 | — | 11,540 | — | 11,680 | — | 8,540 | — |

*Not an example of the present invention.
[a]Percent by weight based on the weight of the resin.
[b]Percent by weight based on the weight of resin plus styrene.
[c]Epoxidized soybean oil.
[d]Cobalt naphthenate (6% Co).
[e]Cycles to failure.

EXAMPLE 2

A paste concentrate for addition to vinyl ester and unsaturated polyester resins is prepared by blending the following:

| | |
|---|---|
| styrene | 30.8 percent |

| | | | | |
|---|---|---|---|---|
| percent[b] | 1.3 | 1.3 | 1.3 | 1.3 |
| Ceresin Wax, gms | 0.2 | 0.2 | 0.2 | 0.2 |
| percent[c] | 0.2 | 0.2 | 0.2 | 0.2 |
| Corn oil, gms | 0.3 | 0.3 | 0.3 | 0.3 |
| percent[c] | 0.3 | 0.3 | 0.3 | 0.3 |
| ESO[d], gms | 0.4 | 0.4 | 0.4 | 0.4 |
| percent[c] | 0.4 | 0.4 | 0.4 | 0.4 |
| Styrene, gms | 0.4 | 0.4 | 0.4 | 0.4 |
| percent[e] | 0.7 | 0.7 | 0.7-0.8 | 0.7-0.8 |

TABLE II-continued

|  | Formulation | | | |
| --- | --- | --- | --- | --- |
|  | A | B | C | D |
| Temp., °F. | 74–76 | 75 | 77 | 76–77 |
| °C. | 23.3–24.4 | 23.9 | 25 | 24.4–25 |
| Relative Humidity, percent | 62–70 | 66 | 60–63 | 60–64 |
| Styrene loss g/m² | 96 | 86 | 40 | 56 |

*Percent by weight based on the weight of the resin.
*Percent by weight based on the weight of resin plus styrene excluding the styrene included in the paste additive.
*Percent by weight based on the weight of resin plus styrene including the styrene added via the paste additive.
*Epoxidized soybean oil.
*Percent by weight based on the weight of the resin.

What is claimed is:

1. A substrate material saturated or impregnated with a curable composition comprising (A) at least one vinyl ester resin or at least one unsaturated polyester resin or a combination thereof; (B) at least one polymerizable, vaporizable, ethylenically unsaturated monomer; (C) a polymerizable, vaporizable, ethylenically unsaturated monomer emission suppression amount of ceresin wax; (D) a drying oil in an amount of from about 0.1 to about 0.7 percent by weight based upon the combined weight of resin and polymerizable, vaporizable, ethylenically unsaturated monomer; (E) an epoxidized drying oil in an amount of from about 0.2 to about 0.7 percent by weight based upon the combined weight of resin and polymerizable, vaporizable, ethylenically unsaturated monomer; and (F) a curing amount of a curing agent.

2. The substrate material of claim 1 wherein said polymerizable, vaporizable, ethylenically unsaturated monomer is employed in an amount of from about 20 to about 60 percent by weight based upon the combined weight of resin and polymerizable, vaporizable, ethylenically unsaturated monomer, said ceresin wax is employed in an amount of from about 0.15 to about 0.40 percent by weight based upon the combined weight of resin and polymerizable, vaporizable, ethylenically unsaturated monomer.

3. The substrate material of claim 1 wherein said polymerizable, vaporizable, ethylenically unsaturated monomer is employed in an amount of from about 35 to about 55 percent by weight based upon the combined weight of resin and polymerizable, vaporizable, ethylenically unsaturated monomer, said ceresin wax is employed in an amount of from about 0.15 to about 0.3 percent by weight based upon the combined weight of resin and polymerizable, vaporizable, ethylenically unsaturated monomer, said drying oil is employed in an amount of from about 0.2 to about 0.5 percent by weight based upon the combined weight of resin and polymerizable, vaporizable, ethylenically unsaturated 4. The substrate material of claim 1 wherein said vinyl ester resin is one which has been prepared from a diglycidyl ether of bisphenol A and methacrylic acid, said polymerizable, vaporizable, ethylenically unsaturated monomer is :%-tyrene and is employed in an amount of from about 40 to about 50 percent by weight based upon the combined weight of resin and polymerizable, vaporizable, ethylenically unsaturated monomer, said ceresin wax is employed in an amount of from about 0.18 to about 0.25 percent by weight base@upon the combined weight of resin and polymerizable, vaporizable, ethylenically unsaturated monomer, said drying oil is corn oil and is employed in an amount of from about 0.25 to about 0.40 percent by weight based upon the combined weight of resin and polymerizable, vaporizable, ethylenically unsaturated monomer, and said epoxidized drying oil is epoxidized soybean oil and is employed in an amount of from about 0.35 to about 0.5 percent by weight based upon the combined weight of resin and polymerizable, vaporizable, ethylenically unsaturated monomer.

* * * * *